(12) United States Patent
Baron (10) Patent No.: US 11,630,379 B2
(45) Date of Patent: Apr. 18, 2023

(54) OPTICAL POWER REDUCTION BY MASKING PIXELS OF IMAGE CONTENT

(71) Applicant: Microvision, Inc., Redmond, WA (US)

(72) Inventor: Henry J. Baron, Kirkland, WA (US)

(73) Assignee: Microvision, Inc., Redmond, WA (US)

( * ) Notice: Subject to any disclaimer, the term of this patent is extended or adjusted under 35 U.S.C. 154(b) by 84 days.

(21) Appl. No.: 16/807,887

(22) Filed: Mar. 3, 2020

(65) Prior Publication Data

US 2021/0278756 A1 Sep. 9, 2021

(51) Int. Cl.
*G03B 21/20* (2006.01)
*H04N 9/31* (2006.01)
*G02B 26/10* (2006.01)

(52) U.S. Cl.
CPC ....... *G03B 21/2033* (2013.01); *G02B 26/105* (2013.01); *H04N 9/3129* (2013.01); *H04N 9/3152* (2013.01); *H04N 9/3161* (2013.01)

(58) Field of Classification Search
CPC ...... H04N 9/31–3197; G03B 21/00–64; G02B 26/00–129
See application file for complete search history.

(56) References Cited

U.S. PATENT DOCUMENTS

| 2009/0147224 A1* | 6/2009 | Kurozuka | H04N 9/3129 353/98 |
| 2015/0036105 A1* | 2/2015 | Ide | G01S 17/08 353/31 |
| 2016/0080709 A1* | 3/2016 | Viswanathan | H04N 9/3155 353/85 |

* cited by examiner

*Primary Examiner* — Toan Ton
*Assistant Examiner* — Christopher Lamb
(74) *Attorney, Agent, or Firm* — Kevin D. Wills (57) ABSTRACT

A scanning laser projection system includes a virtual protective housing circuit to automatically reduce accessible emissions of visible laser light by decimating areas of a projected image to reduce optical power exposure levels for safety, comfort, aesthetic, or system classification purposes. IR laser light pulses are scanned in a field of view, and a percentage of visible laser light pulses are blanked based on attributes of reflections of the IR laser light pulses.

18 Claims, 9 Drawing Sheets

OPTICAL POWER REDUCTION BY MASKING PIXELS OF IMAGE CONTENT

FIELD

The present invention relates generally to laser projection systems, and more specifically to safety of laser projection systems.

BACKGROUND

Products that include laser devices generally fall into different laser safety classes based on the possibility that they can cause damage to the human eye or skin. International Standard IEC 60825.1 describes example laser safety classes. Although many different laser safety classes exist, one major distinction between classes is whether a product is considered "eye-safe" or "non-eye-safe." Eye-safe laser systems are generally considered to be incapable of producing damaging radiation levels during operation, and are also generally exempt from device marking requirements, control measures, or other additional safety measures. IEC 60825.1 classifies eye-safe products as Class1. Products that include high power laser devices that would otherwise be classified as non-eye-safe, may nevertheless be classified as eye-safe if the product includes additional safety measures such as a protective housing that reduces the accessible emission limits to a safe level.

DESCRIPTION OF EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
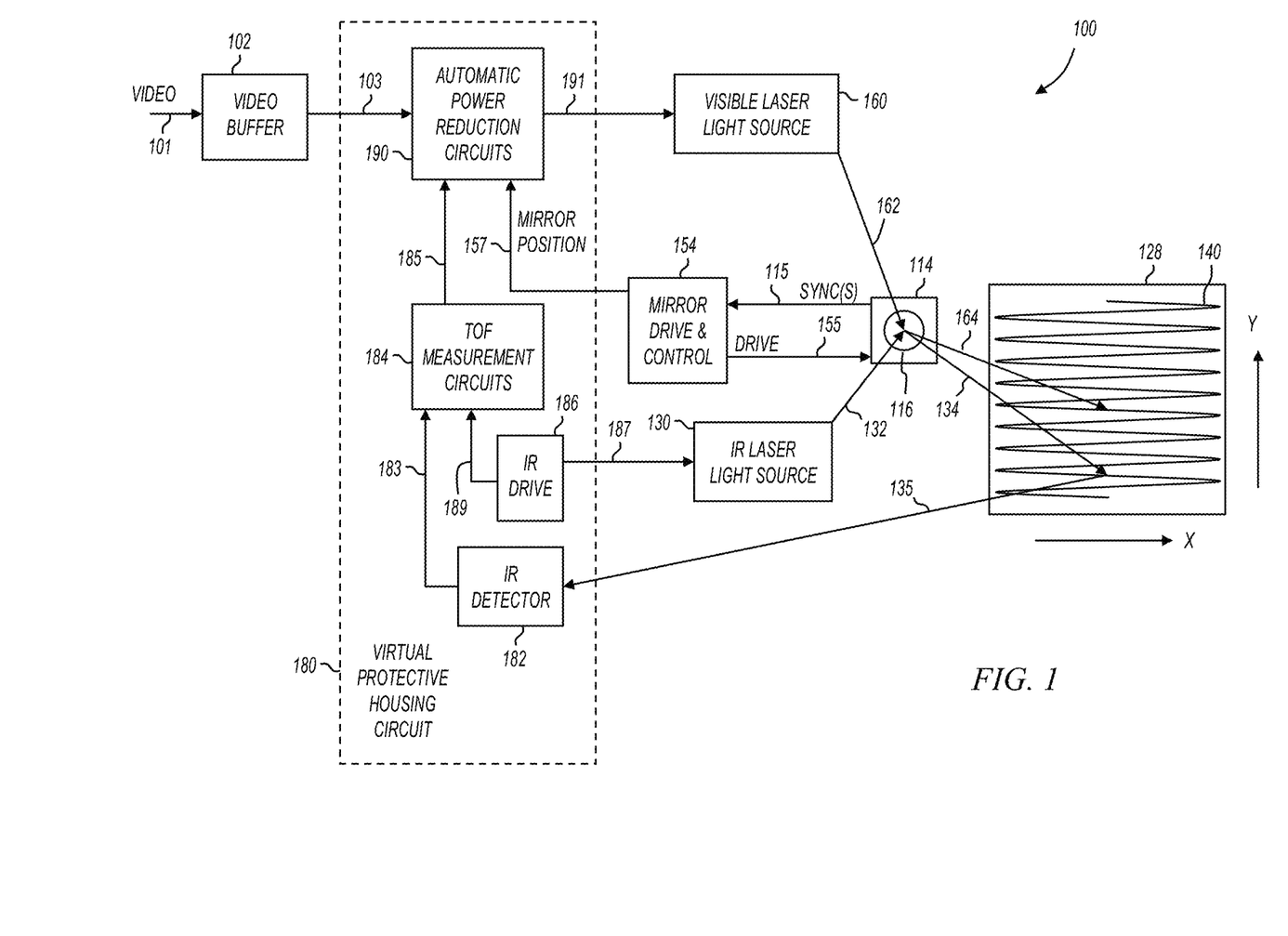
FIG. 1 shows a scanning laser projection system with automatic power reduction in accordance with various embodiments of the present invention.

FIG. 1 shows a scanning laser projection system with automatic power reduction in accordance with various embodiments of the present invention. System 100 includes visible laser light source 160, infrared (IR) laser light source 130, scanning mirror assembly 114 with scanning mirror 116, and mirror drive and control circuit 154. System 100 also includes video buffer 102 and virtual protective housing circuit 180.

Visible laser light source 160 includes one or more light sources capable of emitting light in the visible spectrum. For example, in some embodiments, visible laser light source 160 includes multiple laser diodes that emit light at the same wavelength or at different wavelengths in the visible spectrum. For example, in some embodiments, laser light source 160 includes a first laser diode that emits red light, a second laser diode that emits green light, and a third laser diode that emits blue light. The terms "red," "green," and "blue" are used herein to refer to wavelengths that are perceived by a human eye as that particular color. For example, "red" refers to any wavelength of light that a human may perceive as the color red, "green" refers to any wavelength of light that a human may perceive as the color green, and "blue" refers to any wavelength of light that a human may perceive as the color blue.

In some embodiments, laser light source 160 includes optics whose purpose is to combine light beam paths such that light from any of light sources within light source 160 travels on the same or similar collimated path shown as modulated laser beam 162. The beam 162 impinges on a scanning mirror assembly 114 which in some embodiments is part of a microelectromechanical system (MEMS) based scanner or the like, and reflects off of scanning mirror 116 to generate a controlled output beam 164.

A scanning mirror drive and control circuit 154 provides one or more drive signal(s) 155 to control the angular motion of scanning mirror 116 to cause output beam 164 to traverse a raster scan trajectory 140 in a field of view 128. In operation, light source 160 produces modulated light pulses in the visible spectrum and scanning mirror 116 reflects the light pulses as beam 164 traverses raster scan trajectory 140 to produce a visible image in field of view 128.

In some embodiments, raster scan trajectory 140 is formed by combining a sinusoidal component on the horizontal axis and a sawtooth component on the vertical axis. In these embodiments, controlled output beam 164 sweeps back and forth left-to-right in a sinusoidal pattern, and sweeps vertically (top-to-bottom) in a sawtooth pattern with the display blanked during flyback (bottom-to-top). FIG. 1 shows the sinusoidal pattern as the beam sweeps vertically top-to-bottom, but does not show the flyback from bottom-to-top. In other embodiments, the vertical sweep is controlled with a triangular wave such that there is no flyback. In still further embodiments, the vertical sweep is sinusoidal. The various embodiments of the present invention are not limited by the waveforms used to control the vertical and horizontal sweep or the resulting raster pattern. The vertical axis is also referred to as the slow scan axis, and the horizontal axis is also referred to as the fast-scan axis. The labels "vertical" and "horizontal" are somewhat arbitrary, since a 90 degree rotation of the apparatus will switch the horizontal and vertical axes. Accordingly, the terms "vertical" and "horizontal" are not meant to be limiting.

Although scanning mirror 116 is shown as a single mirror that scans in two dimensions, this is not a limitation of the present invention. For example, in some embodiments, mirror 116 is replaced by two mirrors, one scanning in one dimension, and a second scanning in a second dimension. Further, although system 100 is described having one or more MEMS devices to perform scanning of laser light pulses, this is not a limitation of the present invention. Any device or method for scanning light pulses along a scan path may be employed without departing from the scope of the present invention.

In operation, mirror drive and control circuit 154 provides drive signal(s) 155 to control the angular motion of scanning mirror 116. In some embodiments, scanning mirror 116 includes one or more sensors to detect the angular position or angular extents of the mirror deflection (in one or both dimensions). For example, in some embodiments, scanning mirror assembly 114 includes a piezoresistive sensor that delivers a voltage that is proportional to the deflection of the mirror on the fast-scan axis. Further, in some embodiments, scanning mirror assembly 114 includes an additional piezoresistive sensor that delivers a voltage that is proportional to the deflection of the mirror on the slow-scan axis. The mirror position information is provided back to mirror drive and control circuit 154 as one or more SYNC signals 115. In these embodiments, mirror drive and control circuit 154 includes one or more feedback loops to modify the drive signals in response to the measured angular deflection of the mirror. In addition, in some embodiments, mirror drive and control circuit 154 includes one or more phase lock loop circuits to produces one or more signals 157 that estimates the instantaneous angular position of the scanning mirror based on the SYNC signals.

Mirror drive and control circuit 154 is implemented using functional circuits such as phase lock loops (PLLs), filters, adders, multipliers, registers, processors, memory, and the like. Accordingly, mirror drive and control circuit 154 may be implemented in hardware, software, or in any combination. For example, in some embodiments, control circuit 154 is implemented in an application specific integrated circuit (ASIC). Further, in some embodiments, some of the faster data path control is performed in an ASIC and overall control is software programmable.

IR laser light source 130 includes one or more laser light sources capable of emitting nonvisible light such as infrared (IR) light. For example, in some embodiments, IR laser light source 130 may include one or more laser diodes that produce infrared light with a wavelength of substantially 850 nanometers (nm). Also for example, in some embodiments, light source 130 may include one or more laser diodes that produce infrared light with a wavelength of substantially 900 nanometers (nm) The wavelength of light is not a limitation of the present invention. Any wavelength of light may be used without departing from the scope of the present invention.

In some embodiments, laser light source 130 includes optics whose purpose is to combine light beam paths such that light from any of light sources within light source 130 travels on the same or similar collimated path shown as modulated laser beam 132. The beam 132 reflects off of scanning mirror 116 to generate a controlled output beam 134 in the same manner that beam 162 reflects off scanning mirror 116 to generated controlled output beam 164.

In some embodiments, visible laser light source 160 and IR laser light source 130 feed light beams 162 and 132 to scanning mirror 116 at different angles resulting in an angular separation of controlled output beams 164 and 134 resulting in the IR laser light pulses traversing the field of view 128 out in front of the visible laser light pulses in one or both dimensions. For example, in some embodiments, the laser light sources are positioned relative the scanning mirror assembly to cause the IR laser light pulses to scan a non-zero number of scan lines ahead of the visible laser light pulses as shown in FIG. 1. Also for example, in some embodiments, the laser light sources are positioned relative to the scanning mirror assembly to cause the IR laser light pulses to scan ahead of the visible laser light pulses in both dimensions.

In some embodiments, both controlled output beams 164 and 134 traverse substantially the same raster scan trajectory 140 across the field of view 128, and in other embodiments, controlled output beams 164 and 134 traverse slightly different raster scan trajectories in part because they may have an angular separation that may not be an exact multiple of the angular separation of scan lines.

In some embodiments, IR laser light source 130 includes two laser light sources that are positioned relative to the visible laser light sources and the scanning mirror assembly to cause two separate controlled IR output beams that are on either side of the visible controlled output beam. For example, a first IR laser light source may produce controlled output beam 134 that scans ahead of controlled output beam 164 when scanning down as shown in FIG. 1, and a second IR laser light source may produce a second controlled IR output beam (not shown) that scans ahead of controlled output beam 164 when scanning up, either during a bidirectional scan (e.g., sinusoidal or triangular slow scan) or during flyback.

Video buffer 102 stores one or more rows of video content at 101 and provides drive values on node 103 to virtual protective housing circuit 180, which then conditionally passes the same drive values to visible laser light source 160. The drive values correspond to electrical currents used to drive laser light sources within light source 160 (e.g., red, green, and blue laser diodes) such that the output intensity from the lasers is consistent with the input video content. In some embodiments, this process occurs at output pixel rates in excess of 150 MHz.

Virtual protective housing circuit 180 includes IR drive circuit 186, IR detector 182, time-of-flight (TOF) measurement circuits 184, and automatic power reduction circuits 190. IR drive circuit 186 produces pulsed signals on node 187 to drive IR laser light source 130. In some embodiments, the pulsed signals on node 187 are spaced in time such that projected IR laser light pulses have a spatial density in the field of view 128 sufficient to illuminate objects (other than the intended projection surface) that may be present in the field of view. For example, IR laser light pulses may be projected at the same spatial density as visible laser light pulses, or may be projected at a higher spatial density or lower spatial density than visible laser light pulses.

IR detector 182 includes one or more photosensitive devices capable of detecting reflections of IR laser light pulses. For example, IR detector 182 may include one or more PIN photodiodes, Silicon photomultipliers (SiPM), avalanche photodiodes (APD), or the like. Each point in the field of view that is illuminated with an IR laser light pulse (referred to herein as a "reflection point") reflects some amount of the incident light back to IR detector 182, and IR detector 182 provides a signal 183 to TOF measurement circuits 184 that represents the timing of the received reflections of IR laser light pulses.

TOF measurement circuits 184 measure times-of-flight of IR laser light pulses to determine distances to reflection points. In some embodiments, IR drive 186 provides a timing signal 189 corresponding to the emission time of a particular IR laser light pulse to TOF measurement circuits 184, and TOF measurement circuits 184 measure the TOF of IR laser light pulses by determining the elapsed time between the emission of the pulse and reception of the reflection of the same pulse.

Automatic power reduction circuits 190 identifies one or more areas within the field of view to reduce power of the visible laser light pulses in response to received reflections of IR laser light pulses, and automatically reduces power of the visible laser light pulses in the identified area of the field of view. For example, in some embodiments, automatic power reduction circuits 190 may include circuits to determine areas of non-planarity of depth data produced by TOF measurement circuits 184. Also for example, automatic power reduction circuits 190 may include one or more decimating circuits that decimate displayed image content by blanking a percentage of pixels so that accessible emissions are reduced in the identified areas. These and other embodiments are described more fully below with reference to later figures.

In some embodiments, the virtual protective housing circuits of the present invention operate to reduce accessible emission levels to levels similar to those provided by physical protective housings. For example, various embodiments of the present invention automatically reduce the power of visible laser light emissions in identified areas of the field of view to ensure that emissions accessible to a human eye are kept at eye-safe levels.

The example system of FIG. 1 shows the IR laser light pulses scanning "out in front" of the visible laser light pulses, although this is not a limitation of the present invention. For example, in some embodiments, the IR scan may lag the visible light scan. Also for example, in some embodiments, a non-scanned detection method is employed, such as outer boundary detection. In still further embodiments, in an unscanned system such as flash LIDAR, the detection may be on a frame basis and pixel decimation may be applied to the frame immediately following the frame of detection. Further, after the power reduction criteria are detected, the system may retain the power reduction and restore full power after a period of time or by other detection criteria, scanned or unscanned.

Figure 2:
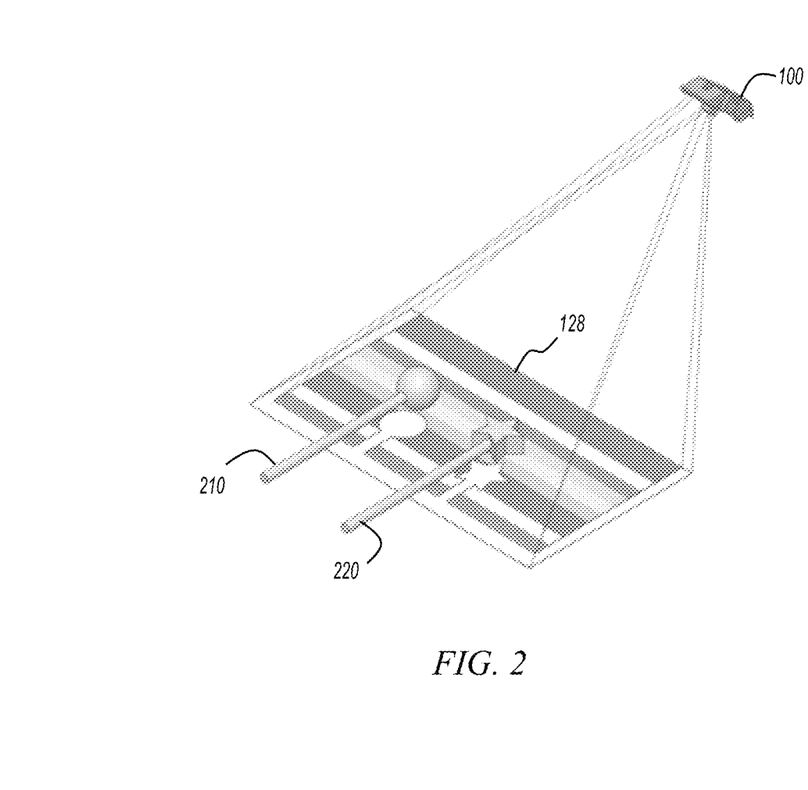
FIG. 2 shows objects in a field of view of a scanning laser projector in accordance with various embodiments of the present invention.

FIG. 2 shows objects in a field of view of a scanning laser projector in accordance with various embodiments of the present invention. Scanning laser projection system 100 is shown projecting video content in field of view 128. The video content is represented in the figure by the horizontal stripes in the field of view. Two objects 210 and 220 are shown in the field of view in front of the projection surface.

Various embodiments of the present invention detect objects 210 and 220 in the field of view and reduce the power of visible laser light emissions in the area of the objects to provide a virtual protective housing that protects the objects from accessing laser radiation levels above eye-safe limits.

Figure 3:
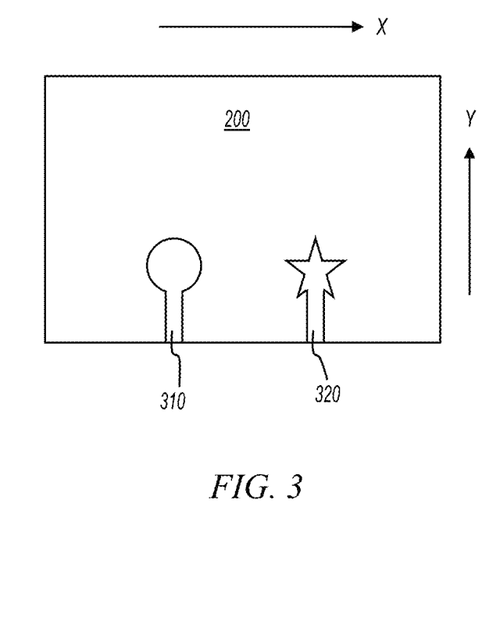
FIG. 3 shows areas of reduced power in the field of view in accordance with various embodiments of the present invention.

FIG. 3 shows areas of reduced power in the field of view in accordance with various embodiments of the present invention. Areas 310 and 320 are identified by scanning laser projection system 100 as areas to reduce power, and the emitted laser power in these areas is automatically reduced. Area 310 corresponds to the area of the field of view surrounding object 210, and area 320 corresponds to the area of the field of view surrounding object 220.

In some embodiments, areas 310 and 320 are identified by virtual protective housing circuits 180 (FIG. 1) by filtering depth data and determining areas of the field of view that are non-planar or that are closer to (or farther from) the projection system than the rest of the projection surface 200. These determinations may be made by measuring the times-of-flight of reflections of IR laser light pulses from reflection points that are out in front of the visible laser pulses in the scan trajectory.

In some embodiments, VPH circuit 180 reduces power in the identified areas of the field of view by decimating the video content. For example, the power may be reduced by 50% by blanking every other visible laser light pulse corresponding to every other pixel in the image. Any amount of power reduction may be implemented by controlling the amount of decimation without departing from the scope of the present invention. In some embodiments, power is reduced in areas of the field of view beyond just the area of non-planarity. These and other embodiments are described in more detail below with reference to later figures.

Figure 4:
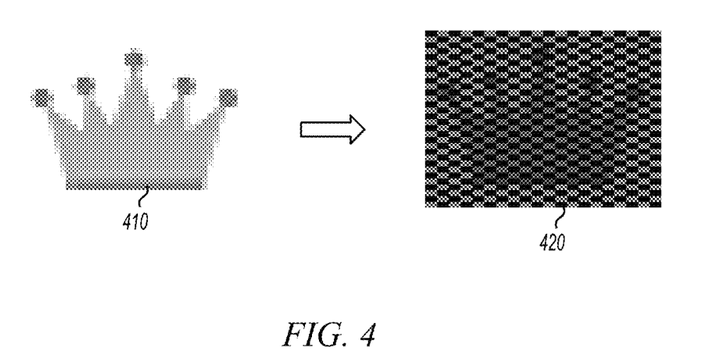
FIG. 4 shows decimation of pixels in an image in accordance with various embodiments of the present invention.

FIG. 4 shows decimation of pixels in an image in accordance with various embodiments of the present invention. Object 410 represents an object detected in the field of view that is closer to the projector than the projection surface. For example, object 410 may be object 210 or 220 in FIG. 2. Virtual protective housing circuit 180 (FIG. 1) detects object 410 and identifies an area 420 about the object to reduce accessible emissions. As shown in FIG. 4, the virtual protective housing circuit decimates the image in area 410. In the example of FIG. 4, the image is decimated by 50% by blanking one half of the pixels; however, this is not a limitation of the present invention. For example, decimation may be performed at 25%, 12.5%, or any other percentage. Also for example, the power reduction may be achieved by blanking every other pixel or groups of pixels. For example, 50% reduction may be achieved by blanking every other pixel, or alternately blanking and not blanking n pixels, where n is any integer.

In some embodiments, area 420 is a rectangle as shown in FIG. 4. In other embodiments, area 420 takes the shape of the object. In the example of FIG. 4, area 420 may take the shape of a crown. In still further embodiments, area 420 may extend further beyond the shape of the object. For example, area 420 may be expanded to cover "blind spots" due to parallax caused by the relative locations of the light sources and light detectors. These and other embodiments are described more fully below with reference to later figures.

Figure 5:
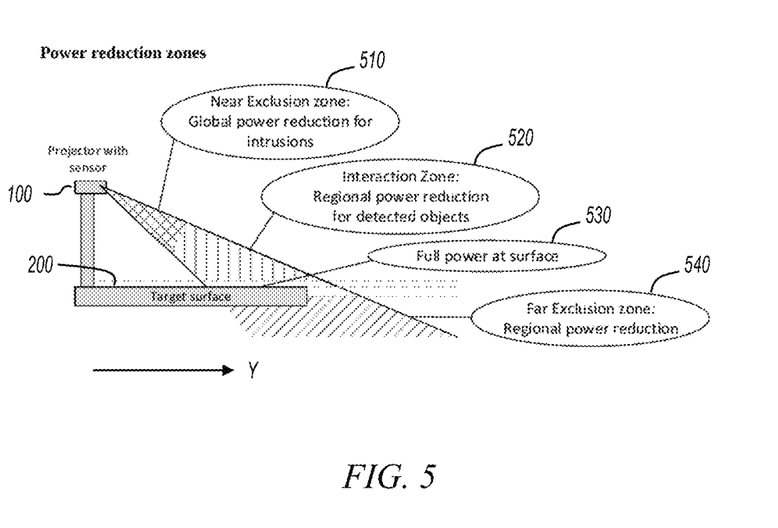
FIG. 5 shows power reduction zones in accordance with various embodiments of the present invention.

FIG. 5 shows power reduction zones in accordance with various embodiments of the present invention. Projector 100 is shown projecting image content on projection surface 200. As shown in FIG. 5, various embodiments of the present invention define multiple power reduction zones, where each zone is a function of distance from distance from the projector and/or projection surface.

Zone 530 is referred to as the full power zone. Full power zone 530 is defined as the projection surface and very near the projection surface. No power reduction is applied in zone 530. Zone 520 is referred to as the interaction zone. Objects detected in interaction zone 520 will trigger image decimation by virtual protective housing 180 (FIG. 1) to reduce accessible emissions as describe above with reference to previous figures. Zone 510 is referred to as the near exclusion zone. Near exclusion zone 510 is a zone that is close to the projector 100. In some embodiments, when an object is detected in near exclusion zone 510, accessible emissions are reduced in the entire field of view by decimating the entire image. In some embodiments, the distance from the projector that defines the near exclusion zone is programmable. These and other embodiments are described further below.

Zone 540 is referred to as the far exclusion zone. Far exclusion zone 540 is defined as distances farther from the projector than the projection surface. For example, if an object is detected at a distance that is further than projection surface 200, the object is classified as being in far exclusion zone 540. Also for example, if virtual protective housing 180 (FIG. 1) fails to detect the projection surface 200 or any object, then the corresponding area is classified as being in far exclusion zone 540. In some embodiments, accessible emissions are reduced in the entire area of the field of view that falls in the far exclusion zone 540. For example, if projection surface 200 is a table top, and projector 100 is placed such that a portion of the image is projected off the edge of the table, that portion of image is classified as being in the far exclusion zone, and accessible emissions are reduced by decimating the image in that area.

In some embodiments, if an area of the field of view is classified as being in a far exclusion zone, a heightened criteria may be established for reclassifying that area as being back in the full power zone. For example, consider the possibility that the far exclusion zone may be off the end of a table, and a child may bring their face very close to, and substantially parallel with, the projection surface 200. Without a heightened criteria to reclassify the area as in the full power zone, the child's eyes may be exposed at full power. If the heightened criteria is defined such that the detection of the child's face will not result in full power operation, then the virtual protective housing will maintain reduced accessible emission in the presence of the child's eyes. Heightened criteria may be defined in any manner without departing from the scope of the present invention. For example, heightened criteria may be defined as a stricter definition of a plane or an increased number of image frames that satisfy the full power zone criteria.

In some embodiments, in one or both of near exclusion zone 510 and far exclusion zone 540, the amount of decimation used to reduce accessible emissions is different from the amount of decimation used to reduce accessible emissions in interaction zone 520. For example, in some embodiments, accessible emissions are reduced more when an object is detected in the near exclusion zone 510 than when an object is detected in the interaction zone 520. Also for example, in some embodiments, accessible emissions are reduced more when an object is detected in the far exclusion zone 540 than when an object is detected in the interaction zone 520. The amount of decimation in the near and far exclusion zones relative to the amount of decimation in the interaction zone is not a limitation of the present invention.

As shown in FIG. 5, in some embodiments, accessible emissions are reduced in the entirety of the field of view by decimating image content in the entirety of the field of view, and in other embodiments, accessible emissions are reduced in a subset of the field of view by decimating image content in a subset of the field of view.

Figure 6:
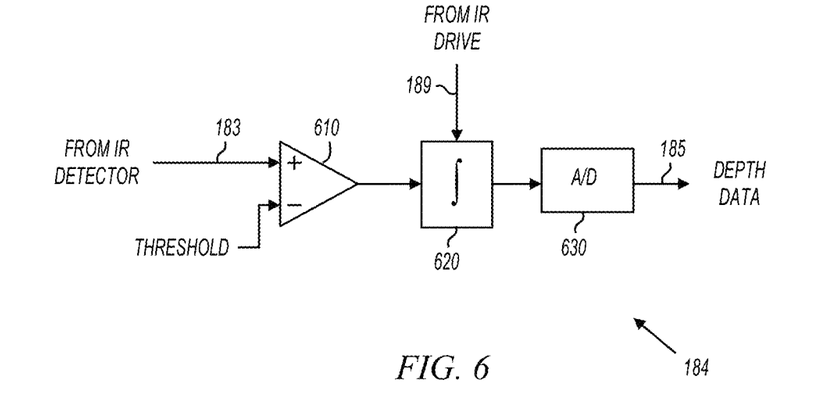
FIG. 6 shows a time-of-flight measurement circuit in accordance with various embodiments of the present invention.

FIG. 6 shows a time-of-flight measurement circuit in accordance with various embodiments of the present invention. Time-of-flight measurement circuit 184 measures the TOF of IR laser light pulses and provides the results as depth data at 185. Integrator 620 receives the pulse timing 189 corresponding to the timing of the emission of an IR laser light pulse. Integrator 620 starts an integration period when a light pulse is emitted, and the integration period is stopped when the amplitude of the reflected pulse exceeds the threshold as determined by comparator 610. Analog-to-digital converter (A/D) 630 receives the output of integrator 620 and produces a digital signal at 185 that corresponds to the time-of-flight (TOF) of the laser pulse, which in turn corresponds to the distance (Z) between TOF measurement circuit 184 and the reflection point in the field of view.

The time-of-flight measurement circuit shown in FIG. 6 is an example circuit that may be implemented in system 100 (FIG. 1). In some embodiments, different circuits are used to measure time-of-flight. For example, in some embodiments, a digital counter is used to measure the time between the emission of an IR laser light pulse and the detection of a reflection of the same IR laser light pulse.

Figure 7:
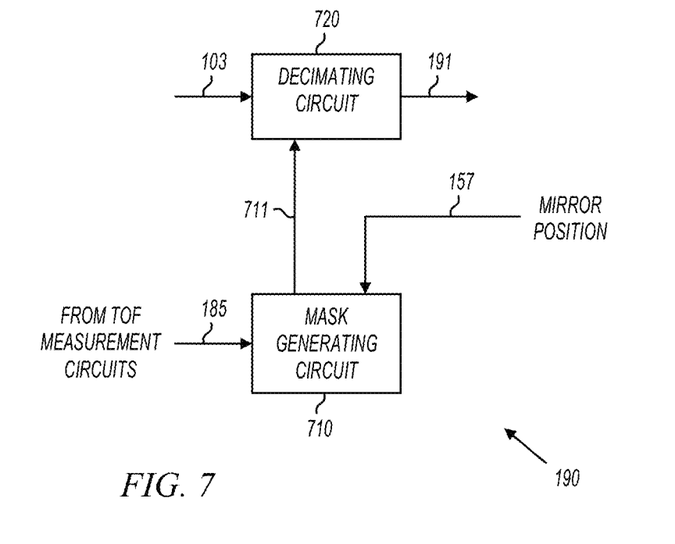
FIG. 7 shows an automatic power reduction circuit in accordance with various embodiments of the present invention.

FIG. 7 shows an automatic power reduction circuit in accordance with various embodiments of the present invention. Automatic power reduction circuit 190 includes mask generating circuit 710 operable to create a mask in response to the IR measurement circuits, and decimating circuitry 720 to reduce accessible emissions by blocking individual visible laser light pulses from being emitted in at least a portion of the field of view in response to the mask.

As used herein, the term "automatic power reduction" refers to power reduction that occurs without direct human intervention. An example of automatic power reduction is shown in FIG. 4 where image content is decimated in response to reflections of IR laser light pulses without human intervention in the real-time decision process.

In some embodiments, mask generating circuit 710 produces a buffered data set that includes masking information as well as mirror position information that specifies where the masking information is to be applied in the field of view. In these embodiments, mask data 711 may include tuples that each include mirror position and masking information, or (x,y,b), where (x,y) is a location in the field of view, and (b) is a bit that specifies whether to mask visible laser light emissions at location (x,y). In other embodiments, the pipeline delay introduced by mask generating circuit 710 and decimating circuit 720 matches the time delay between IR laser light pulses and visible laser light pulses illuminating the same area in the field of view, and masking information at 711 is used to decimate visible emissions when received. In these embodiments, mirror position information may not be utilized by either mask generating circuit 710 or blanking circuit 720.

Figure 8:
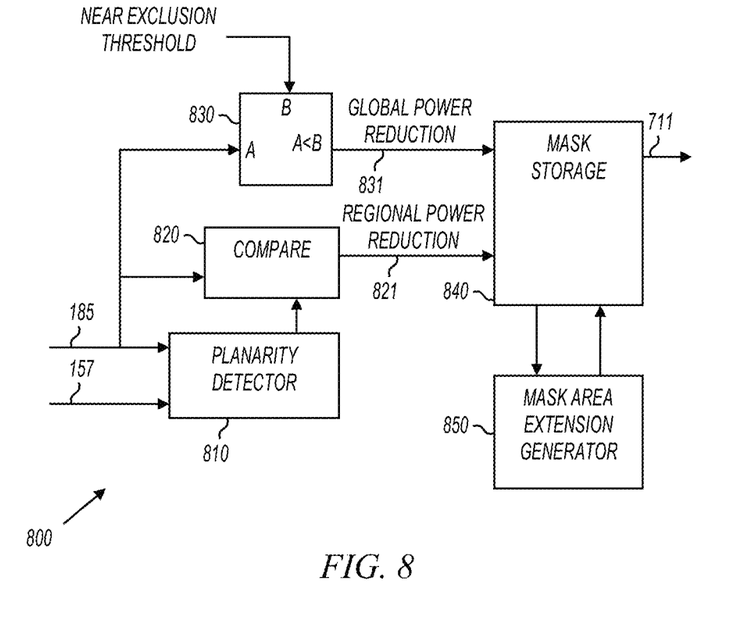
FIGS. 8 and 9 show mask generating circuits in accordance with various embodiments of the present invention.

FIG. 8 shows a mask generating circuit in accordance with various embodiments of the present invention. Mask generating circuit 800 may implement mask generating circuit 710 (FIG. 7). Mask generating circuit 800 includes planarity detector 810, comparators 820 and 830, mask storage 840, and mask extension generator 850. In operation, planarity detector 810 receives depth data 185 and mirror position data 157, and determines the plane of the projection surface. Comparator 820 compares depth data at each reflection point with the plane of the projection surface and determines if an object is detected in the interaction zone or the far exclusion zone (FIG. 5). Comparator 820 then provides mask storage 840 with regional power reduction data at 821. Similarly, comparator 830 compares depth data at each reflection point with a near exclusion zone threshold to determine if an object is detected is in the near exclusion zone. Comparator 830 then provides mask storage 840 with global power reduction data at 831.

Mask area extension generator 850 operates to conditionally extend masked areas of the field of view. For example, in some embodiments, mask area extension generator 850 extends mask areas to rectangular areas such as that shown in FIG. 4. Also for example, in some embodiments, mask area extension generator 850 extends the mask area in one or both dimensions (x,y) to mask blind spots resulting from parallax caused by the relative locations of light sources and light detectors. In still further embodiments, mask area extension generator 850 extends the mask area in one or both dimensions (x,y) to the extents of the field of view to create a shadow effect. These and other embodiments are described more fully below.

Mask area extension generator 850 may be implemented using any suitable circuit structures. For example, in some embodiments, mask area extension generator 850 may include registers, digital adders, comparators, finite state machines, and the like. The manner in which mask area extension generator 850 is implemented is not a limitation of the present invention.

Figure 9:
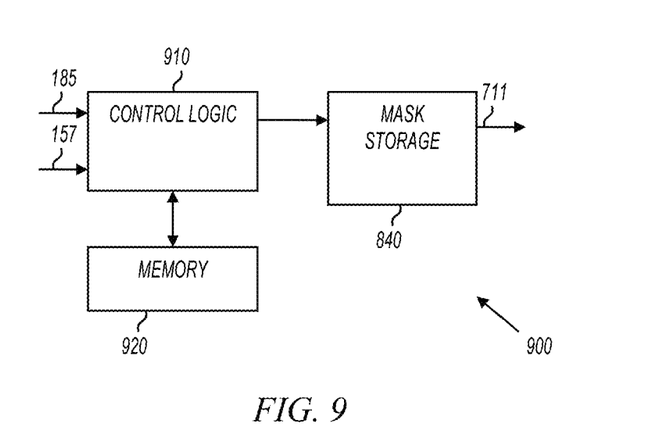

FIG. 9 shows a mask generating circuit in accordance with various embodiments of the present invention. Mask generating circuit 900 may implement mask generating circuit 710 (FIG. 7). Mask generating circuit 900 includes control logic 910, memory 920, and mask storage 840.

Control logic 910 may include any circuitry capable of generating a mask as described herein. For example, in some embodiments, control logic 910 may include a microprocessor, digital signal processor, microcontroller, or the like, capable of executing instructions stored in memory 920. Memory 920 may be any non-transitory digital storage device capable of storing instructions executable by control logic 910. For example, memory 920 may be volatile memory such as static random access memory, nonvolatile memory such as FLASH memory, or any other type of non-transitory storage device.

Also for example, in some embodiments, control logic 910 may be implemented in a field programmable gate array (FPGA). In these embodiments, memory 920 may store FPGA configuration information that is loaded into control logic 910 at a power-up or reset event. In other embodiments, control logic 910 is implemented in an application specific integrated circuit (ASIC). In these embodiments, memory 920 may be used for buffering or masking, or may be omitted. The manner in which control logic 910 is implemented is not a limitation of the present invention.

In operation, control logic 910 receives depth data and mirror position data and determines if objects are detected in the interaction zone, near exclusion zone, or far exclusion zone, and generates masks accordingly. Further, control logic 910 may extend masks to encompass blind spots and/or to extend to the extents of the field of view in one or more dimensions.

Figure 10:
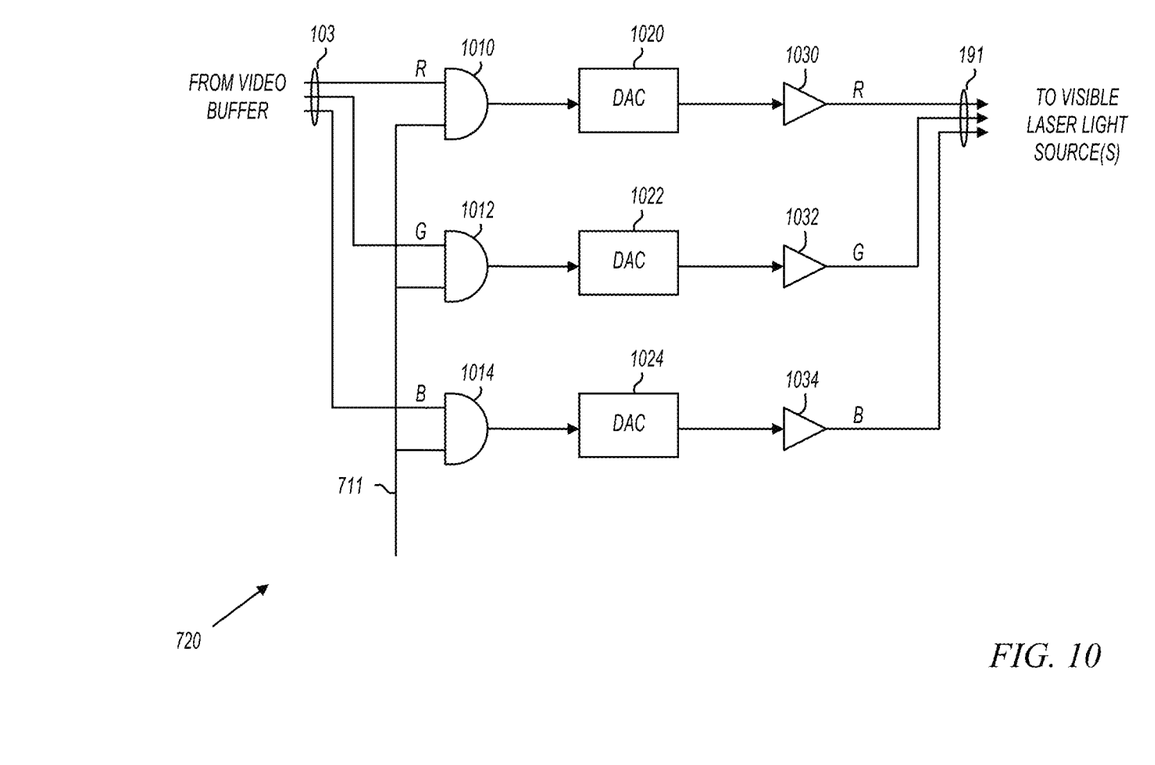
FIG. 10 shows a decimating circuit in accordance with various embodiments of the present invention.

FIG. 10 shows a decimating circuit in accordance with various embodiments of the present invention. Decimating circuit 720 includes blanking gates 1010, 1012, and 1014, digital-to-analog converters (DAC) 1020, 1022, and 1024, and amplifiers 1030, 1032, and 1034.

In operation, decimating circuit 720 receives video data 103 from video buffer 102 (FIG. 1). In embodiments represented by FIG. 10, the video data includes digital data that represents the intensity of red, green, and blue light for a given pixel to be displayed in the field of view. The mask bit at 711 operates to blank the red, green, and blue data when asserted, thereby reducing the power to zero. When not blanked, DACs 1020, 1022, and 1024 convert the digital values to analog values, and amplifiers 1030, 1032, and 1034 amplify and condition the drive signals to be sent to the visible laser light sources 160.

The blanking circuit implementation shown in FIG. 10 is an example of a circuit that reduces the power of visible laser light emissions, and the various embodiments of the present invention are not limited in this respect. For example, in some embodiments, automatic power reduction may be performed by variable gain amplifiers, attenuators, digital shifters or subtractors, or the like.

Figure 11:
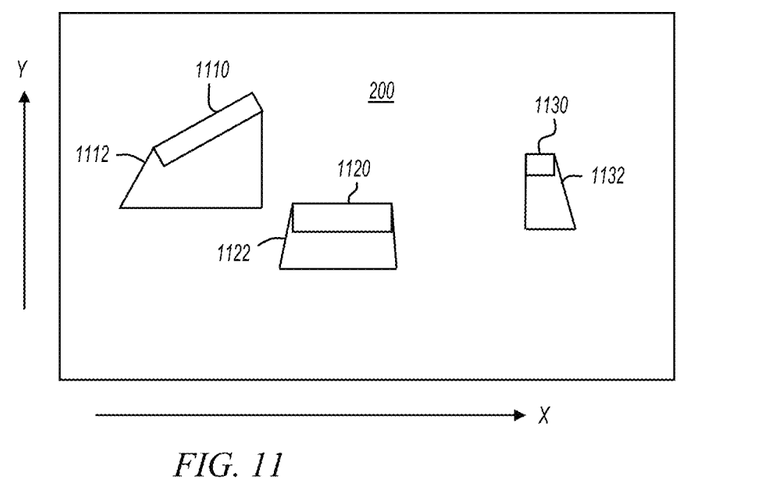
FIGS. 11 and 12 show mask extensions in a field of view in accordance with various embodiments of the present invention.
Figure 12:
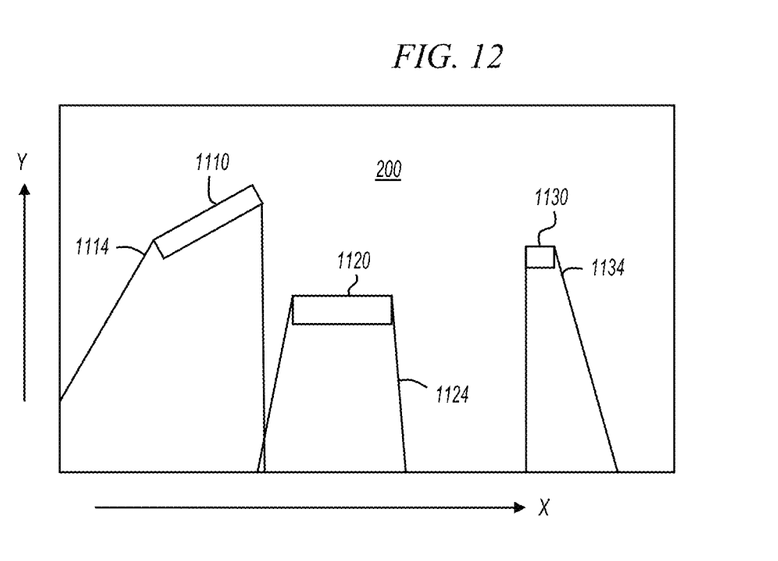

FIGS. 11 and 12 show mask extensions in a field of view in accordance with various embodiments of the present invention. FIGS. 11 and 12 show objects 1110, 1120, and 1130 that are detected in the interaction zone. The area encompassed by objects 1110, 1120, and 1130 is masked and the image content is decimated to reduce accessible emissions as described above. In embodiments represented by FIG. 11, the masked area extends beyond the area encompassed by objects 1110, 1120, and 1130 to include mask extensions 1112, 1122, and 1132. And in embodiments represented by FIG. 12, the masked area extends beyond the area encompassed by objects 1110, 1120, and 1130 to include mask extensions 1114, 1124, and 1134. Mask extension 1114, 1124, and 1134 differ from mask extensions 1112, 1122, and 1132 in that mask extensions 1114, 1124, and 1134 extend to the extents of the field of view in the vertical dimension.

The area of mask extensions 1112, 1114, 1122, 1124, 1132, and 1134 may be determined by a mask area extension generator such as mask area generator 850 (FIG. 8) or by a control logic such as control logic 910 (FIG. 9).

Figure 13:
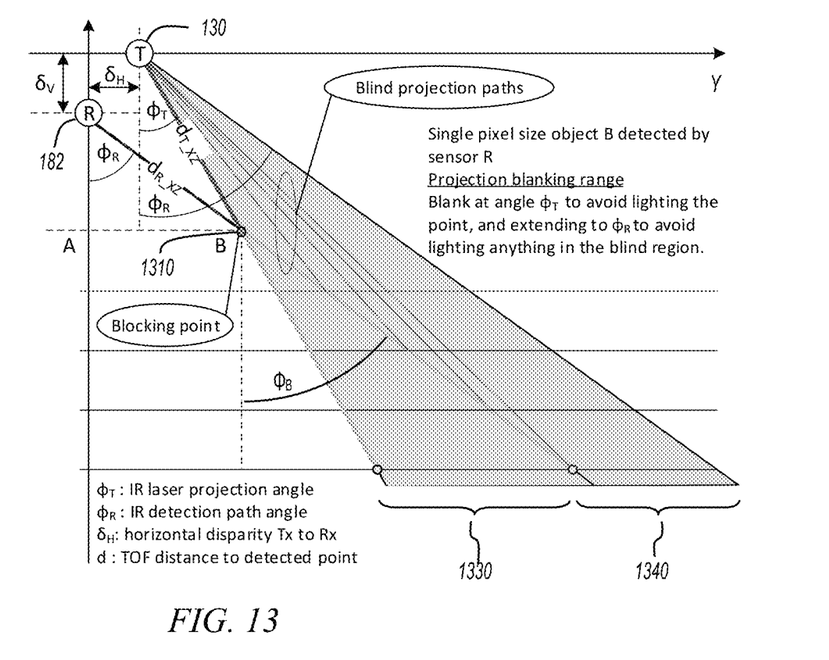
FIG. 13 shows blind projection paths as a result of parallax in accordance with various embodiments of the present invention.

FIG. 13 shows blind projection paths as a result of parallax in accordance with various embodiments of the present invention. In the example of FIG. 13, if an object 1310 is detected in the field of view at the position shown, a blind spot is created between projection angles of $\Phi_T$ and $\Phi_B$ due to parallax resulting from the relative placement of light source 130 and light detector 182. In some embodiments, the resulting mask includes the area encompassed by object 1310 as well as a mask extension that extends to the area 1330 to encompass the blind spot. Further, in some embodiments, the resulting mask extension also includes the area 1340. This simplifies processing by allowing the mask to extend between the angles of $\Phi_T$ and $\Phi_R$, both of which are easily determined. In still further embodiments, the mask extension extends to the end of the field of view in the y dimension, resulting in a mask extension represented by those shown in FIG. 12.

Figure 14:
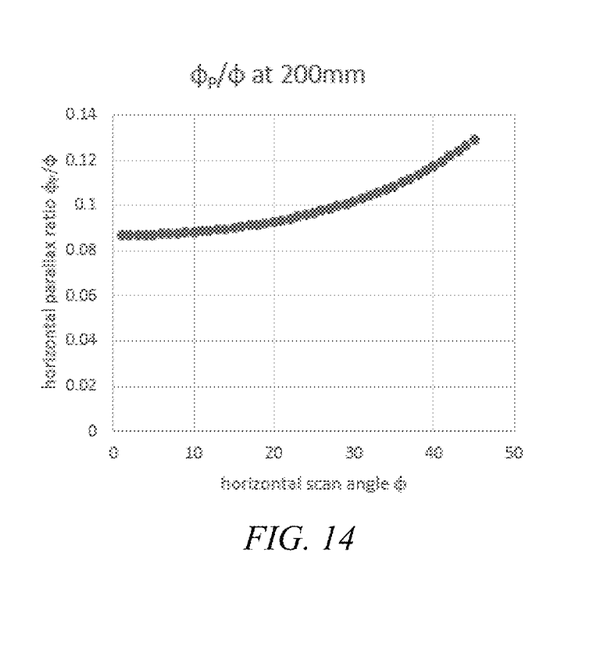
FIG. 14 shows a horizontal parallax ratio in accordance with various embodiments of the present invention.

FIG. 14 shows a horizontal parallax ratio in accordance with various embodiments of the present invention. The horizontal parallax ratio shown in FIG. 14 is an example parallax angle phi P as a function of scan angle phi. This ratio results from the physical design of system 100, and may be increased or decreased to either enlarge or reduce the mask extension in the horizontal (x) dimension. In operation, the width (x) of mask extensions may be determined by applying the horizontal parallax ratio to mask extensions.

Examples of mask extension widths and variations as a function of scan angle can be seen in mask extensions 1112, 1114, 1122, 1124, 1132, and 1134 (FIGS. 11, 12).

Figure 15:
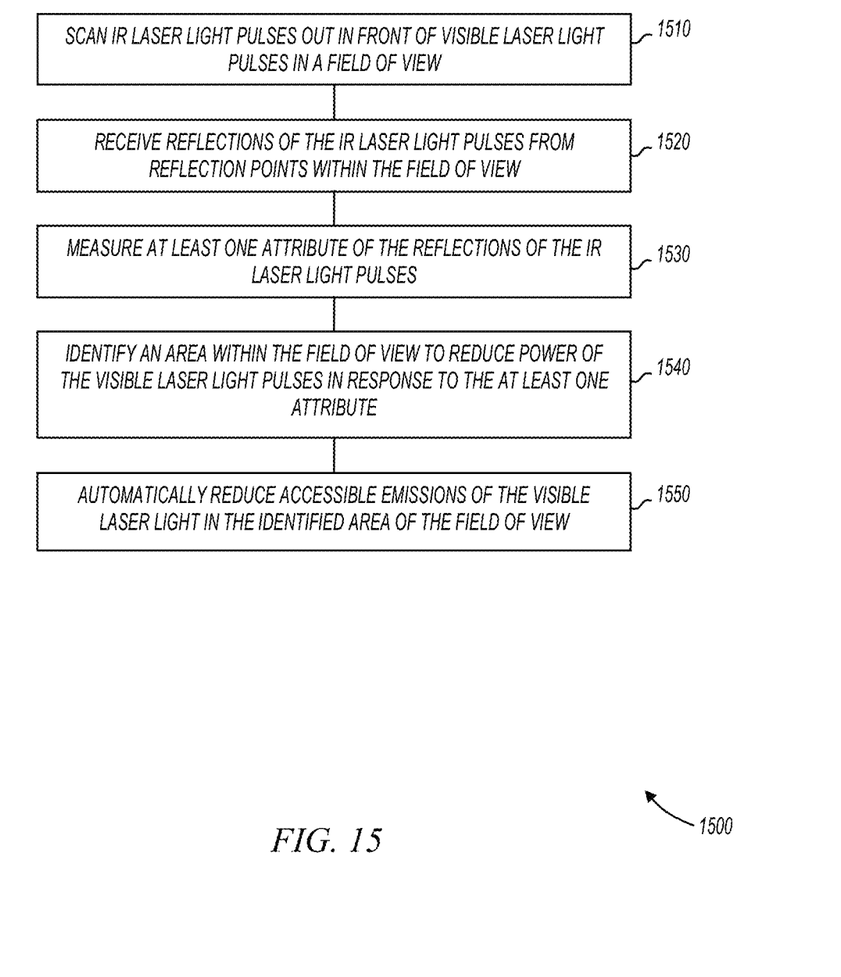
FIG. 15 shows a flow diagram of methods in accordance with various embodiments of the present invention.

FIG. 15 shows a flow diagram of methods in accordance with various embodiments of the present invention. In some embodiments, method 1500, or portions thereof, is performed by a scanning laser projection system, embodiments of which are shown in previous figures. In other embodiments, method 1500 is performed by a series of circuits or an electronic system. Method 1500 is not limited by the particular type of apparatus performing the method. The various actions in method 1500 may be performed in the order presented, or may be performed in a different order. Further, in some embodiments, some actions listed in FIG. 15 are omitted from method 1500.

Method 1500 is shown beginning with block 1510. As shown at 1510, IR laser light pulses are scanned out in front of visible laser light pulses in a field of view. In some embodiments, an IR laser light source and a visible laser light source are positioned relative to a scanning mirror assembly to cause an angular separation between the IR laser light pulses and the visible laser light pulses. In some embodiments, the IR laser light pulses are maintained at an eye-safe power level, so that when the IR laser light pulses are the only laser radiation emitted from the device performing method 1500, the device is considered eye-safe. Unlike the IR laser light pulses, the visible laser light pulses, when present, may have higher emission levels that would be considered non-eye-safe when operated without a virtual protective housing with automatic power reduction.

At 1520, reflections of the IR laser light pulses from reflection points within the field of view are received. In some embodiments, this corresponds to a photosensitive device detecting the IR pulses as described above. At 1530, at least one attribute of the reflections of the IR laser light pulses are measured. In some embodiments, a time-of-flight of IR laser light pulses is measured.

At 1540, an area within the field of view to reduce power of the visible laser light pulses in response to the at least one attribute is identified. For example, in some embodiments, an area of non-planarity may be identified to reduce power. Also for example, an object may be identified in a near exclusion zone or a far exclusion zone. This may correspond to an area within the field of view that encompasses one or more objects such as shown in FIGS. 11 and 12. In some embodiments, the far exclusion zone may be determined as an area in the field of view in which depth data indicates the lack of a projection surface, and in these embodiments, the visible laser light pulses may be decimated or blanked completely.

At 1550, the accessible emissions of the visible laser light is automatically reduced in the identified area of the field of view. In some embodiments, this corresponds to blanking some of the visible laser light pulses to decimate pixels in a projected image. In other embodiments, this corresponds to creating mask extensions that encompass an area of the field of view that is larger than detected objects, and decimating pixels in the area of the mask extension as well as the area encompassing the detected object.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. An apparatus comprising:
    a scanning mirror assembly to scan incident light in a field of view;
    a first laser light source to produce visible laser light pulses to generate pixels in the field of view;
    a second laser light source to produce infrared (IR) laser light pulses, wherein the first and second laser light sources are positioned relative to the scanning mirror assembly to cause the IR laser light pulses to scan a portion of the field of view at a different time than the visible laser light pulses scan the portion of the field of view; and
    a virtual protective housing circuit to generate depth data from the received reflections of IR laser light pulses and to determine at least one mask area within the field of view using the depth data, the virtual protective housing circuit to alternately blank groups of pixels and not blank groups of pixels in a checkered pattern over the at least one mask area to reduce a number of visible laser light pulses in the at least one mask area and to reduce accessible emissions of the apparatus, and wherein the virtual protective housing circuit is operable to blank groups of pixels by blocking visible laser light pulses from being emitted and is operable to not blank groups of pixels by not blocking visible laser light pulses from being emitted.

2. The apparatus of claim 1 wherein the virtual protective housing circuit is operable to alternately blank groups of pixels and not blank groups of pixels in the checkered pattern over the at least one mask area by alternately blanking and not blanking n pixels, where n is an integer.

3. The apparatus of claim 1 wherein the virtual protective housing circuit is further operable to alternately blank groups of pixels and not blank groups of pixels in an entirety of a projected image in response to a measured distance in the depth data being below a threshold, and further operable to alternately blank groups of pixels and not blank groups of pixels over portions of the projected image that extend beyond the projection surface.

4. The apparatus of claim 1 wherein the virtual protective housing circuit comprises:
    an IR light detector to detect reflections of IR laser light pulses; and
    a time-of-flight (TOF) measurement circuit responsive to the IR light detector to measure distances to reflection points in the field of view.

5. The apparatus of claim 4 wherein the virtual protective housing circuit is operable to alternately blank groups of pixels and not blank groups of pixels in an entirety of a projected image when at least one measured distance is below a threshold.

6. The apparatus of claim 4 wherein the virtual protective housing circuit comprises a planarity detector and wherein the planarity detector determines the at least one mask area where non-planarity is detected.

7. The apparatus of claim 6 wherein the planarity detector determines the at least one mask area to extend beyond areas where non-planarity is detected in at least one dimension.

8. The apparatus of claim 1 wherein the first and second laser light sources are positioned relative to the scanning mirror assembly to cause the IR laser light pulses to scan a non-zero number of scan lines ahead of the visible laser light pulses.

9. An apparatus comprising:
a first laser light source to emit visible laser light pulses;
a second laser light source to emit infrared (IR) laser light pulses;
a scanning mirror assembly to scan the IR laser light pulses in two dimensions in a field of view and scan the visible laser light pulses in the two dimensions to generate pixels in a projected image in the field of view;
time-of-flight measurement circuitry to produce depth data representing distances to a projection surface in the field of view in response to received reflections of IR laser light pulses; and
a virtual protective housing circuit, the virtual protective housing circuit operable to identify at least one mask area in at least a portion of the field of view in response to detected non-planarity near the projection surface in the depth data and alternately blank groups of pixels and not blank groups of pixels in a checkered pattern over the at least one mask area to reduce a number of visible laser light pulses in the at least one mask area, and wherein the virtual protective housing circuit is operable to blank groups of pixels by blocking visible laser light pulses from being emitted and is operable to not blank groups of pixels by not blocking visible laser light pulses from being emitted.

10. The apparatus of claim 9 wherein the virtual protective housing circuit is further operable to alternately blank groups of pixels and not blank groups of pixels in a checkered pattern over entirety of the projected image in response to a measured distance in the depth data being below a first threshold.

11. The apparatus of claim 9 wherein the virtual protective housing circuit is further operable to alternately blank groups of pixels and not blank groups of pixels in a checkered pattern over portions of the projected image that extend beyond the projection surface.

12. The apparatus of claim 9 wherein the virtual protective housing circuit is operable to identify the at least one mask area in the at least the portion of the field of view in response to detected non-planarity by identifying areas that go beyond areas of non-planarity in at least one dimension in the field of view.

13. The apparatus of claim 12 wherein the virtual protective housing circuit is operable to alternately blank groups of pixels and not blank groups of pixels in the checkered pattern over the at least one mask area by alternately blanking and not blanking n pixels, where n is an integer.

14. The apparatus of claim 9 wherein the IR laser light pulses emissions are below a targeted power level threshold.

15. A method comprising:
scanning infrared (IR) laser light pulses out in front of visible laser light pulses in a field of view, where the visible laser light pulses generate pixels;
receiving reflections of the IR laser light pulses from reflection points within the field of view;
measuring times of flight of the reflections of the IR laser light pulses to produce depth data;
detecting an area of non-planarity in the depth data and determining at least one mask area within the field of view based on the detected area of non-planarity; and
alternately blanking groups of pixels and not blanking groups of pixels over the at least one mask area to reduce a number of visible laser light pulses in the at least one mask area, wherein the alternately blanking groups of pixels and not blanking groups of pixels over the at least one mask area to reduce the number of the visible laser light pulses comprises alternately blanking and not blanking in a checkered pattern, and wherein the blanking groups of pixels comprises blocking visible laser light pulses from being emitted and wherein the not blanking groups of pixels comprises not blocking visible laser light pulses from being emitted.

16. The method of claim 15 wherein the determining at least one mask area comprises extending the at least one mask area beyond the area of non-planarity.

17. The method of claim 16 wherein the area beyond the area of non-planarity extends to a limit of the field of view in at least one dimension.

18. The method of claim 15 further comprising:
determining an area of the field of view in which the depth data indicates an area lacking a projection surface; and
blanking the visible laser light pulses in the area lacking the projection surface.

* * * * *